(12) United States Patent
Dambricourt

(10) Patent No.: US 9,617,042 B2
(45) Date of Patent: Apr. 11, 2017

(54) INJECTION-MOLDED FLEXIBLE TUBE BASED ON HIGH-DENSITY POLYETHYLENE

(71) Applicant: CEP Tubes, Saint-Remy-sur-Durolle (FR)

(72) Inventor: Géry Dambricourt, Escoutoux (FR)

(73) Assignee: CEP Tubes, Saint-Remy-sur-Durolle (FR)

( * ) Notice: Subject to any disclaimer, the term of this patent is extended or adjusted under 35 U.S.C. 154(b) by 0 days.

(21) Appl. No.: 14/600,678

(22) Filed: Jan. 20, 2015

(65) Prior Publication Data

US 2015/0203252 A1 Jul. 23, 2015

(30) Foreign Application Priority Data

Jan. 17, 2014 (FR) ..................................... 14 50398
Feb. 17, 2014 (FR) ..................................... 14 51259

(51) Int. Cl.
| | | |
|---|---|---|
| *B65D 35/08* | (2006.01) | |
| *B29D 23/20* | (2006.01) | |
| *B29C 45/00* | (2006.01) | |
| *B29K 23/00* | (2006.01) | |
| *B29K 105/00* | (2006.01) | |

(52) U.S. Cl.
CPC .......... *B65D 35/08* (2013.01); *B29C 45/0001* (2013.01); *B29D 23/20* (2013.01); *B29K 2023/065* (2013.01); *B29K 2023/0625* (2013.01); *B29K 2105/0088* (2013.01); *B29K 2995/0063* (2013.01)

(58) Field of Classification Search
CPC .... B29D 23/20; B29D 35/00; B29C 45/0001; B29K 2023/065; B29K 2023/0625; B29K 2995/0063; B29K 2105/0088
See application file for complete search history.

(56) References Cited

U.S. PATENT DOCUMENTS

| | | |
|---|---|---|
| 6,124,008 A | 9/2000 | Barre |
| 7,381,455 B2 | 6/2008 | Dambricourt |
| 8,365,955 B2 | 2/2013 | Bosshardt |
| 2003/0194521 A1 | 10/2003 | Dambricourt |
| 2007/0082160 A1 | 4/2007 | Dambricourt |
| 2007/0210103 A1 | 9/2007 | Bosshardt |

FOREIGN PATENT DOCUMENTS

| | | |
|---|---|---|
| EP | 0 856 554 | 8/1998 |
| FR | 2 806 385 | 9/2001 |
| FR | 2 872 792 | 1/2006 |
| WO | WO 01/68355 | 9/2001 |

OTHER PUBLICATIONS

Search Report dated Sep. 10, 2014 in corresponding French Application No. 1451259 (8 pages).

*Primary Examiner* — Nathan M Nutter
(74) *Attorney, Agent, or Firm* — Brinks Gilson & Lione; G. Peter Nichols

(57) ABSTRACT

The present invention relates to a tube having a dispensing head and a flexible skirt. The skirt and the dispensing head include a single wall manufactured in a single injection-molding operation in an injection mold. According to the invention, the wall is made of a material whose base constituent is a high-density polyethylene (HDPE) or a mixture of polymers, at least one of which is a high-density polyethylene representing from 5% to 100% by weight of the polymers constituting the wall. The present invention also relates to a process for manufacturing such a tube.

9 Claims, No Drawings

INJECTION-MOLDED FLEXIBLE TUBE BASED ON HIGH-DENSITY POLYETHYLENE

This application claims priority to French patent application No. 1450398 filed Jan. 17, 2014 and to French patent application No. 1451259 filed Feb. 17, 2014; the entire contents of which are incorporated herein by reference.

BACKGROUND

The invention relates to packaging made of high-density polyethylene, especially a flexible tube, which is resistant to stress cracking and which acts as a barrier especially to water vapor.

SUMMARY

For the purposes of the present invention, the term "polyethylene" means not only a polyethylene homopolymer whose repeating unit is ethylene, but also by extension an ethylene-olefin copolymer with an alternation of two repeating units, one of which is ethylene. Polyethylenes are usually referred to by the abbreviation PE.

For the purposes of the present invention, the term "high-density polyethylene" means a polyethylene as defined previously and whose density is at least equal to 0.94 g/cm3. High-density polyethylenes are usually referred to by the abbreviation HDPE (and by the abbreviation LHDPE when the high-density polyethylene is linear).

The flexible tube according to the invention is especially intended to contain pasty products such as toothpastes, pharmaceutical products, cosmetology products, food products, hygiene products, toothpastes, cleansing products, fatty substances, fats, mastics or adhesives.

These products may to a greater or lesser extent contain surfactants, which are capable of bringing about stress cracking of the wall of the tube.

For the purposes of the present invention, the term "stress cracking" means a phenomenon of physicochemical attack of a surfactant product on a polymer, which is reflected by the formation of microcracks in the polymer, which may go as far as resulting in the splitting of the wall.

After filling, the tube is closed off by pinching the wall and welding the two lips thus made, which are bearing against each other.

Splitting of the wall is usually observed in the region of the weld.

The products contained in the flexible tube also contain water to a greater or lesser extent. At the present time, in particular in cosmetics, packaged products are evolving towards water-based emulsions. The packaging of these products must thus satisfy criteria of impermeability to water vapor (or "water barrier"), which are increasingly stringent, so as to avoid:

excessive loss of weight of the cream contained in the tube, this weight loss being attributable to the migration through the wall of the tube of the water borne in vapor form due to the packaging of the cream in the closed volume of the tube, and consequently, a modification of the pasty nature of the cream packaged in the tube.

The permeability to water is always measured as a percentage of the weight loss induced by the evaporation of the water contained in the cream, relative to the initial weight of the cream contained in the tube during filling. The weight loss ratio thus depends simultaneously on the porosity to water vapor of the wall, and on the ratio between the evaporation surface area (i.e. the surface area of the wall of the tube) and the volume of cream contained in the tube.

Finally, the wall of the tube must be made of a flexible material, to allow the dispensing of the products of pasty type contained therein, by simple pressure on the wall. A person skilled in the art knows how to make, by injection molding, flexible tubes made of low-density polyethylene.

For the purposes of the present invention, the term "low-density polyethylene" means a polyethylene as defined previously and whose density is between 0.88 g/cm$^3$ and 0.94 g/cm$^3$. Low-density polyethylenes are usually referred to by the abbreviation LDPE (and by the abbreviation LLDPE when the low-density polyethylene is linear).

LDPE (including LLDPE) combines two advantages for manufacturing a flexible tube via the injection-molding process:

firstly, good resistance to surfactants, which allows the use of polymers with a high melt flow index (MFI) and thus facilitates the injection-molding operation, secondly, a lower flexural modulus than HDPE, which makes it possible to thicken the wall while at the same time conserving its flexibility and thus also facilitates the injection-molding operation.

In counterpart, the weight loss by migration of water vapor through the wall is much greater when the flexible tube is made of LDPE. This phenomenon becomes unacceptable for small-capacity tubes, such as tubes 16 mm in diameter filled to 3 ml, which are commonly used for distributing samples.

European patent application EP 0 856 554 is especially known, which describes a flexible tube whose wall consists of a thermoplastic mixture based on low-density ethylene copolymers with a melt flow index (MFI) of about 10 g/10 minutes.

More particularly, the said document describes a flexible tube made of a thermoplastic material, comprising a first low-density ethylene copolymer with a high melt flow index (MFI) of between 10 and 20 g/10 minutes, and a second low-density ethylene copolymer with a melt flow index (MFI) of between 4 and 10 g/10 minutes.

EP 0 856 554 especially teaches that the thermoplastic mixture must have a high MFI index of the order of 10 g/10 minutes in order to be suitable for the injection-molding of objects with a thin wall, whence the use in the mixture of an ethylene C4-C5 olefin copolymer of between 10 and 20 g/10 minutes. However, such a copolymer is not sufficiently resistant to stress cracking according to the specifications generally demanded by the cosmetics industry.

Moreover, the said European patent application is silent as regards the flexibility properties of the tube as a function of the wall thickness and as regards the properties of impermeability to water vapor of the wall, which constitutes the subject of the present invention.

In practice, the tubes that are the subject of patent application EP 0 856 554 have never been the subject of a concrete industrial application, since they are insufficiently impermeable to water vapor and insufficiently resistant to "stress cracking" to satisfy the specifications generally stipulated by the cosmetics industry.

Moreover, international patent application WO 01/68355, belonging to the present Applicant, is also known, which describes an LDPE-based flexible tube, which is both resistant to stress cracking and impermeable to water vapor. More precisely, WO 01/68355 describes a flexible tube whose wall is made of a thermoplastic material comprising a low-density ethylene copolymer or a mixture of low-density ethylene copolymers, whose density is between 0.880 and 0.935 g/cm³ and whose melt flow index MFI is between 3 and 10.

The flexible tubes described in WO 01/68355 truly resulted in an industrial application since they satisfied the criteria stipulated in the specifications of the cosmetics industry. However, their water barrier is insufficient under certain conditions, either because the ratio of the surface area of the wall to the amount of cream contained in the tube is too unfavorable, or because the characterization of the cream demands the use of a wall that is a strong barrier, or because the weight loss specifications are very stringent.

As a first example, certain cosmetic industries measure the weight loss by placing the flexible tube in a chamber at 50° C. for 2016 hours. Other cosmetic industries place the tube in a chamber at 45° C. for 1440 hours.

Since the first test is much more demanding than the second, an LDPE tube may be simultaneously non-compliant according to the first test and compliant according to the second test, for the same cream and the same volume capacity.

As a second example, the ratio between the surface area of the wall and the amount of cream contained in the tube is very different when a first tube 19 mm in diameter is filled to 5 ml and when a second tube 16 mm in diameter is filled to 3 ml.

In the second situation, the ratio of the evaporation surface area relative to the amount of cream contained in the tube is 34% greater than in the first situation, if the two tubes have the same length, which is usually the case.

It is thus frequent for the first tube to be compliant, whereas the second tube is non-compliant, for the same cream, the two tubes having been made with the same polymer.

To improve the water barrier, it is necessary to use a high-density polyethylene in place of a low-density polyethylene.

There are two reasons for not using HDPE for making flexible tubes via the injection-molding process. Firstly, the rigidity of a PE increases as its density increases. In addition, a second drawback of high-density polyethylenes is their lower resistance to surfactants.

The usual solutions known to those skilled in the art for changing from LDPE to HDPE are thus the following:

reducing the thickness of the wall to compensate for the increase in the flexural modulus of the polymer;

reducing the melt flow index (MFI), to compensate for the reduction in the resistance to surfactants, by increasing the viscosity of the selected polymer.

The usual process for manufacturing HDPE tubes is that of extrusion, which does not present any implementation difficulties since the polymer passes instantaneously from the liquid state to the solid state through the extrusion die. As a result, neither the viscosity of the polymer nor the thickness of the wall is of particular importance.

This well-known process has the serious drawback of being much more expensive than that of injection-molding, since the tube is made in two successive operations of extrusion of the skirt (operation 1) and then overmolding of the tube head onto the skirt (operation 2).

However, it was hitherto impossible to make flexible HDPE tubes via the injection-molding process:

either because of the impossibility of filling the mold cavity, due to the combined effect of the increase in viscosity of the polymer and of the reduction in thickness of the wall, or because of the destruction of the properties of the polymer by exceeding the limit shear rate.

For these two reasons, the injection-molding technique was hitherto exclusively applied to LDPEs.

In this context, the Applicant has discovered that certain HDPEs satisfy the specifications of the cosmetic industry while at the same time being injection-moldable, in the process it designed, in the flow path defined by the wall of the tube. It has thus become possible to manufacture by injection-molding a flexible tube made of high-density polyethylene that is resistant to stress cracking and that has reinforced water-barrier properties.

More particularly, a subject of the present invention is thus a tube consisting of a dispensing head and of a flexible skirt, the said skirt and the said dispensing head consisting of a single wall manufactured in a single injection-molding operation in an injection mold.

According to the invention, the wall of the tube is made of a material whose base constituent is a high-density polyethylene (HDPE) or a mixture of polymers, at least one of which is a high-density polyethylene representing from 5% to 100% and preferably from 15% to 100% by weight of the polymers constituting the wall.

As described previously, the use of HDPE instead of LDPE considerably improves the water-barrier properties of the packaging.

Replacing LDPE with HDPE leads to an improvement of about 35% in terms of weight loss. Thus, the measured weight loss goes from 9% for a flexible tube whose wall is made of LDPE (as described in WO 01/68355) to a weight loss of 6% for an HDPE wall, for an identical packaged cream, a tube volume capacity that is also identical and weight loss measurement conditions that are also identical (exposure time and oven temperature).

The advantage of the tube according to the invention is proportionately greater the greater the weight loss, and thus the smaller the volume capacity of the tube (ratio between the evaporation surface area and the volume capacity), the weight loss measurement always being observed as a percentage of the volume of cream contained in the tube.

A second advantage of the invention is the lowering of the cost price, which may be attributed to the use of thinner walls. By way of example, when the "skirt" of the tube has a length of about 60 mm, it is common for the wall of the injection-molded tube to go from 0.55 mm in LDPE version to 0.35 mm in HDPE version, i.e. a 36% reduction in thickness.

Reduction of the thickness of the wall is simultaneously made possible because of the substantial improvement in the barrier properties and is necessary to compensate for the increase in the flexural modulus of the polymer.

Advantageously, the high-density polyethylene (HDPE) may have a density at least equal to 0.945 g/cm3, preferably at least equal to 0.950 g/cm3, and a melt flow index (MFI) measured according to standard ISO 1133 of between 1 and 4 g/10 minutes and preferably less than or equal to 2 g/10 minutes.

The wall of the tube may advantageously consist of a mixture of polymers comprising at least one low-density polyethylene (LDPE).

Specifically, the HDPE and the LDPE may be mixed without difficulty prior to the injection-molding operation. The mixture may thus be dosed favoring HDPE to obtain a strong-barrier tube, or, on the contrary, favoring LDPE to obtain a more flexible tube.

Depending on the volume capacity of the tube, the desired wall flexibility, and the respective density of the HDPE and of the LDPEs used, the proportion of the HDPE(s) will be between 100% and 5% by weight of the mixture and preferably between 100% and 15% by weight of the mixture, and the proportion of the LDPE(s) will be between 0 and 95% of the mixture and preferably between 0 and 85% by weight of the mixture.

Advantageously, the low-density polyethylene may have a density of between 0.900 g/cm3 and 0.940 g/cm3, preferably in the region of 0.920 g/cm3, and a melt flow index of between 4 and 9 g/10 minutes.

Advantageously, the low-density polyethylene may be a linear polyethylene.

Advantageously, the wall of the tube consists of polymers belonging exclusively to the polyethylene family.

Advantageously, the skirt has a wall thickness of between 0.3 mm and 0.4 mm when its length is between 50 mm and 60 mm.

Advantageously, the wall of the skirt has a thickness E equal to [(L+160)/600]±15%, L defining the length of the wall of the skirt, the dimensions L and E being expressed in mm.

A subject of the present invention is also a process for manufacturing a tube according to the invention, the wall and the head of the tube being formed in a single injection-molding operation in an injection mold.

According to the invention, the walls of the mold constituting the cavity intended to form the skirt of the tube are brought at least locally to a temperature of between 80° C. and 115° C.

Polyethylenes are commonly injected into a mold set at a temperature below 20° C., preferably of about 15° C. The solution of the invention consisted in injecting the tubes into a mold set at least locally at a temperature of between 75° C. and 115° C. It has been discovered that, under these conditions, the polymers or the mixtures of polymers defined in the invention are injection-moldable in the flow path defined by the wall of the tube (for example a cylindrical skirt whose length is 60 mm and whose wall thickness is between 0.30 and 0.40 mm), without destruction by exceeding the limit shear rate.

Correlatively, it has been discovered that increasing the temperature of the mold does not induce either any lengthening of the cycle time or any deformation of the wall during the stripping of the tube from the mold.

Other advantages and features of the present invention will emerge from the description that follows, which is given as a non-limiting example and made with reference to the corresponding examples:

EXAMPLES

Tests:
Water Impermeability Test:

The water impermeability test consists in placing the tubes, filled beforehand with the test product and welded, in an oven maintained at a given temperature for a given period of time.

The weight of the cream is measured before placing the tube in the oven, and then after the test period.

The evaporation of the water vapor corresponds to the weight loss of the cream between the two measurements.

This evaporation is always expressed as a relative value, by calculation of the ratio of the weight after the test period relative to the weight of the cream before testing.

The most usual implementation conditions and acceptance limit conditions are as follows:
oven temperature: 45° C. or 50° C.;
exposure time: 336 or 1440 or 2016 hours;
acceptance limit weight loss of 2% to 9% depending on the exposure temperatures and times selected.

Test for Measurement of the Resistance to Surfactants (Measurement of the Resistance to Stress Cracking)

The test of resistance of the polymer to stress cracking consists in:
filling a sample of tubes with a solution of tridecyl ether diluted to 0.5% in distilled water and welding the tube;
placing the tubes in an oven at 55° C. for 24 hours; and
observing each tube after the test by placing the wall under pressure, to detect any leakage or splitting.

Measurement of the Weight Loss

The empty tube is weighed;
The filled tube is weighed before being dried in oven;
The filled tube is weighed after being dried in oven;
The "weight loss" of the cream during the passage of the tube into the oven is calculated by subtracting The weight loss measures the evaporation of the cream by migration through the wall during the test period, and thus qualifies the barrier property of the tube wall.

Results

Example 1

According to the Prior Art

Sample 1:
10 injection-molded LDPE tubes made according to WO 01/68355
LDPE polymer used—LLDP Dowlex 2035—density 0.919 g/cm$^3$—MFI: 6.0 g/10 minutes (190° C./2-16 kg)
Diameter of the tubes: 19 mm Example 2

According to the Invention

Sample 2:
10 injection-molded tubes according to the process of the invention
Polymers used:
33% LDPE—LLDP Dowlex 2035;
67% HDPE—HDPE Dow 80255—density 0.956 g/cm$^3$—MFI 2 g/10 minutes (190° C./2-16 kg).
Diameter of the Tubes: 19 Mm The tubes of sample 1 and those of sample 2 were subjected to the tests of resistance to stress cracking and of hot impermeability (weight loss). The results are presented in Table 1 below:

TABLE 1

| Test | Sample 1 | Sample 2 |
|---|---|---|
| Resistance to surfactants according to the preceding paragraph | Compliant | Compliant |
| Weight loss cream tested "Vichy Liftactive" temperature 45° C. exposure time 1440 hours. amount packaged 5 ml | 5.00% | 3.5% |
| Weight of the empty tube (tube diameter 19) | 2.3 g | 1.65 g |

These results show that:

the weight loss is improved by 30% on passing from sample 1 (according to the prior art) to sample 2 (according to the invention);

the weight of the empty tube is reduced by 28% on passing from sample 1 (according to the prior art) to sample 2 (according to the invention).

Example 3

According to the Prior Art

Sample 3:

10 injection-molded LDPE tubes made according to WO 01/68355

LDPE polymer used—LLDP Dowlex 2035—density 0.919 g/cm$^3$

Wall thickness of the tubes: 0.45 mm

Diameter of the tubes: 16 mm

Example 4

According to the Invention

Sample 4:

10 injection-molded tubes according to the process of the invention

Polymers used:

90% LDPE—LLDP Dowlex 2035—density 0.919 g/cm3

10% HDPE—HDPE Plurell 6541 (BASELL)—density 0.955 g/cm3

Wall thickness of the tubes: 0.45 mm

Diameter of the tubes: 16 mm

Example 5

According to the Invention

Sample 5:

10 injection-molded tubes according to the process of the invention

Polymers used:

80% LDPE—LLDP Dowlex 2035—density 0.919 g/cm3

20% HDPE—HDPE Plurell 6541 (BASELL)—density 0.955 g/cm3

Wall thickness of the tubes: 0.45 mm

Diameter of the tubes: 16 mm

Example 6

According to the Invention

Sample 6:

10 injection-molded tubes according to the process of the invention

Polymers used:

33% LDPE—LLDP Dowlex 2035—density 0.919 g/cm3

67% HDPE—HDPE Plurell 6541 (BASELL)—density 0.955 g/cm3

Wall thickness of the tubes: 0.33 mm

Diameter of the tubes: 16 mm

Example 7

According to the Invention

Sample 7:

10 injection-molded tubes according to the process of the invention

Polymer used:

100% HDPE—HDPE Plurell 6541 (BASELL)—density 0.955 g/cm3

Wall thickness of the tubes: 0.33 mm

Diameter of the tubes: 16 mm

The tubes of samples 3 to 7 were subjected to the tests of resistance to stress cracking and of hot impermeability (weight loss). The results are presented in Table 2 below:

TABLE 2

| Samples | Characterization of the tube | | | Weight loss cream tested "Vichy Liftactive" temperature 45° C. exposure time |
|---|---|---|---|---|
| | Wall thickness | Weight of tube | Resistance to surfactants | 1440 hours, amount packaged 5 ml |
| Sample 3 | 0.45 mm | 1.85 g | Compliant | 9.50% |
| Sample 4 | 0.45 mm | 1.85 g | Compliant | 7.60% |
| Sample 5 | 0.45 mm | 1.85 g | Compliant | 6.50% |
| Sample 6 | 0.33 mm | 1.35 g | Compliant | 5.00% |
| Sample 7 | 0.33 mm | 1.35 g | Compliant | 3.90% |

Comments of the Results

The barrier properties are improved to a considerable extent with the rising rate of HDPE in the mixture, the weight loss moving from 9.50% when the tube wall is 100% LDPE to 3.90% when the tube wall is 100% HDPE, thus an improvement of 245% barrier properties.

This performance is all the more remarkable that the weight loss of 3.90% is obtained in a tube with a wall of 0.33 mm, against a 9.50% weight loss in a tube with of a wall of 0.45 mm, thus a correlative defatting of the wall by 27%, resulting in a weight gain for the vacuum tube of 50 grams, or also a 27% gain.

The use of HDPE simultaneously multiplies by 2.5 the barrier properties, reduce the curb weight of the tube, thus lowering the cost and meet ecological demand of the decrease in the consumption of raw materials (oil).

The observed results support a finding that improved barrier properties is directly proportional to the proportion of HDPE in the blend of 0% to 100% HDPE.

The invention claimed is:

1. A one-piece tube having a dispensing head and a flexible skirt, the skirt and the dispensing head being manufactured in a single injection-molding operation in an injection mold, wherein the skirt and the dispensing head consist of a single wall forming the one-piece tube, and wherein the wall is made of a material whose base constituent is a high-density polyethylene (HDPE) or a mixture of polymers, at least one of which is a high-density polyethylene representing at least 5% by weight of the polymers constituting the wall.

2. The tube according to claim 1, in which the wall is made of a material whose base constituent is HDPE or a mixture of polymers, at least one of which is a high-density polyethylene representing at least 15% by weight of the polymers constituting the wall.

3. The tube according to claim 1, in which the high-density polyethylene (HDPE) has a density at least equal to 0.945 g/cm$^3$ and a melt flow index (MFI) measured according to standard ISO 1133 of between 1 and 4 g/ 10 minutes.

4. The tube according to claim 1, wherein the mixture of polymers comprises at least one low-density polyethylene (LDPE).

5. The tube according to claim 4, wherein the low-density polyethylene has a density of between 0.900 g/cm$^3$ and 0.940 g/cm$^3$, and a melt flow index of between 4 and 9 g/ 10 minutes.

6. The tube according to claim 5, wherein the low-density polyethylene is a linear polyethylene.

7. The tube according to claim 6, wherein the wall includes polymers consisting of polyethylenes.

8. The tube according to claim 7, in which the skirt has a wall thickness of between 0.3 mm and 0.4 mm and a length of between 50 mm and 60 mm.

9. The tube according to claim 7, wherein the skirt has a length L within the range of L=600E−160, wherein E is the thickness of the wall and dimensions L and E being expressed in mm.

\* \* \* \* \*